United States Patent

Sipin

[15] 3,637,324
[45] Jan. 25, 1972

[54] VEHICLE PROPULSION-ASSISTING SYSTEMS

[72] Inventor: Anatole J. Sipin, 386 Park Avenue S., New York, N.Y. 10016

[22] Filed: Nov. 12, 1969

[21] Appl. No.: 870,177

[52] U.S. Cl................................416/146, 115/1, 152/151, 416/84, 416/86, 416/87
[51] Int. Cl......................................................B63h 1/04
[58] Field of Search..................416/146, 84, 85, 86, 87, 88, 416/158; 415/1 R; 180/7; 152/151, 155

[56] References Cited

UNITED STATES PATENTS

| | | |
|---|---|---|
| 2,497,857 | 2/1950 | Benson........................................115/1 |
| 3,154,043 | 10/1964 | Momsen...................................416/84 |
| 3,221,702 | 12/1965 | Clark.....................................416/84 X |

FOREIGN PATENTS OR APPLICATIONS

| | | |
|---|---|---|
| 1,104,852 | 4/1961 | Germany...................................115/1 |
| 1,018,547 | 1/1966 | Great Britain............................180/7 |

Primary Examiner—Everette A. Powell, Jr.

[57] ABSTRACT

A system for increasing propulsive effectiveness of wheeled vehicles in fluid or soft solid media by pneumatically varying the characteristics of one or more driving wheels. The contour of the outer surface of the wheel is varied between a circular shape and a shape which includes one or more pairs of alternately indented and raised segments by adjustment of fluid pressure within the wheel.

13 Claims, 6 Drawing Figures

PATENTED JAN 25 1972   3,637,324

INVENTOR.
Anatole I Sipin

VEHICLE PROPULSION-ASSISTING SYSTEMS

This invention concerns a system for increasing propulsive effectiveness of wheeled vehicles by pneumatically varying the characteristics of one or more driving wheels. The system is particularly useful for increasing the speed of amphibian vehicles which are driven by the propelling effect of spinning wheels in water. The system should also be of value in adding to propulsive effort or traction in other semifluid or semisolid media, such as mud, snow, sand and soft soil.

There is a present need, particularly for military vehicles, to permit crossing of rivers, bays and other bodies of negotiable waters through propulsion by their driving wheels. A large body of military vehicles has been adapted for flotation; but propulsion by wheels bearing standard tires has been unsatisfactory. Propellers, hydrojets and paddles have been investigated for the propulsion of floatable wheeled vehicles in water. These have proved unsatisfactory from the standpoints of complexity, unreliability, cost and weight.

It is an object of this invention to provide a system to improve propulsion of wheeled vehicles by increasing the propelling effect of a driving wheel in water or the tractive characteristic of the wheel in a semisolid medium.

It is another object of this invention to provide a system which is remotely operable in order to permit rapid variation of wheel characteristics to achieve optimum performance for both road and off-road operation.

It is a third object of this invention to provide a system which will allow conventional floatable wheeled vehicles to ford streams and other bodies of water through their ordinary driving members without recourse to accessory devices, such as propellers and jets.

The invention is a propulsion-assisting system in which the contour of the outer circumference of the driving wheel is varied into alternately indented and raised segments by variation of internal pressure applied to the wheel. By this means a normally circular wheel is varied in shape to approach that of an impeller, comparable to those utilized in rotary pumps of various designs, or, also, a paddle wheel. The contour of the wheel is pneumatically controlled to provide a normal circular shape for driving on paved roads and an optimum shape for other conditions such as propulsion of an immersed vehicle.

Propulsion of wheeled vehicles is improved when the upper portion of the driving wheel extends out of the surface of the water, since the momentum of the entrained water is in a direction opposite to the direction of motion of the vehicle, as, is the case, for example, with a paddle wheel. When the driving wheel is completely submerged, the propulsion is decreased since the momentum of some of the entrained water is in the direction of vehicle motion. Experience has shown that the propulsion of vehicles with submerged wheels is decreased when tire treads are worn. Thus, contouring the wheel to add an impeller or paddle effect should improve the propulsive capability of vehicles propelled by submerged driving wheels.

Different embodiments of the invention are described hereinafter in connection with the following drawings, disclosing various specific features and advantages.

Figure 1:
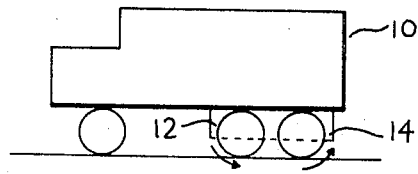
FIG. 1 is a schematic diagram showing the shape of a driving wheel with a controlled contour for operation on a normal surface.
Figure 2:
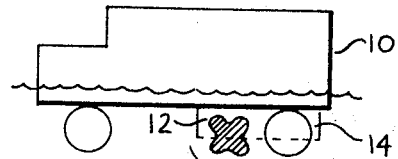
FIG. 2 is a schematic diagram showing variation in the shape of a driving wheel with a controlled contour for operation of a floatable vehicle in water.

Referring now to FIGS. 1 and 2, a floatable wheeled vehicle 10 is illustrated with four driving wheels, of which two are shown, a forward driving wheel 12 and a rear driving wheel 14. For reasons of clarity, only wheel 12 is shown to have a variable contour; but it is to be understood that wheel 14, as well as one or both of the driving wheels on the other side of the vehicle, can be of a similar type. In FIG. 1, wheel 12 is inflated so as to assume a circular shape identical with that of wheel 14. This permits normal operation of the vehicle on solid surfaces, such as paved roads, as if wheel 12 were of a conventional type. In FIG. 2, the vehicle is shown immersed in water as, for example, if it were crossing a river, and the contour of wheel 12 has been varied by internal pressurization to a shape providing increased propulsive effectiveness of the spinning wheel.

If in the immersed condition shown in FIG. 2 the wheel were inflated to a circular contour as shown in FIG. 1, the entrainment of water propelled rearward at the bottom of the wheel would be relatively small, minimal for a smooth wheel surface; and the forward thrust would be comparably small. Model tests have indicated that propulsion of wheeled vehicles with normal tires was much greater than propulsion with tires whose treads were worn smooth. By providing the wheel with a contour similar to that of an impeller or paddle wheel, a much greater entrainment of water should result with a comparably increased thrust. Any entrainment in the forward direction at the top of the tire is reduced by the proximity of the vehicle body. A flexible wiper or roller in contact with the wheel and following its contour at its upper surface should also reduce the amount of circulation and increase thrust. Although the principle is operative for a single driving wheel acting alone, it is enhanced by the use of two driving wheels in tandem as shown in FIGS. 1 and 2. It is seen that the water entrained by wheel 12 in the space between the driving wheels is traveling in an opposite direction from that of the water entrained by wheel 14, further reducing the circulation of water about both wheels and increasing propulsive thrust. Wheel 14 can also be made variably contoured, as is wheel 12; and the interference of flows between them then will be greater, again reducing circulation and increasing thrust. Moreover, in this case, wheel 14, having the same shape as wheel 12, can be positioned so that the protruding segments of one contoured wheel mesh with the indentations of the other contoured wheel, similar to the meshing of impellers in a common gear pump. Improved performance should be achieved by reducing the clearance between wheels, either by inflating them to a larger radial dimension than for the normal circular shape or by bringing the axes of the wheels closer together during the period that their contours are varied for increased propulsion.

Figure 3:
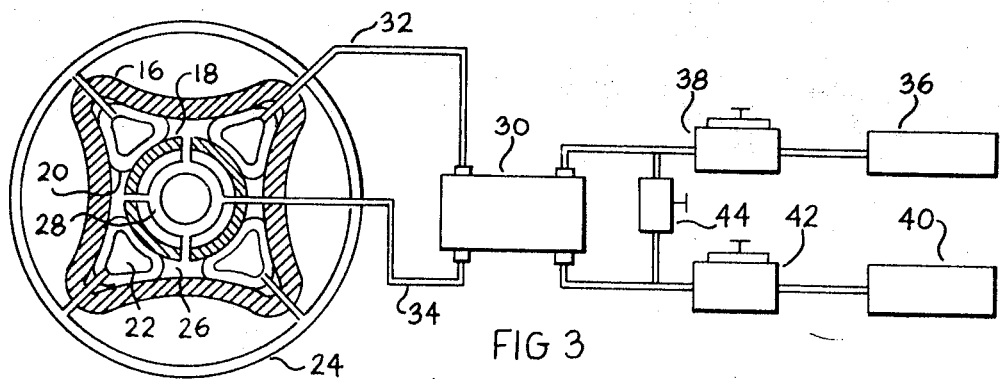
FIG. 3 is a schematic drawing of a propulsion-assisting system showing an inflatable wheel segmented into two sets of alternate pneumatic chambers pressurized from two independent sources.
Figure 6:
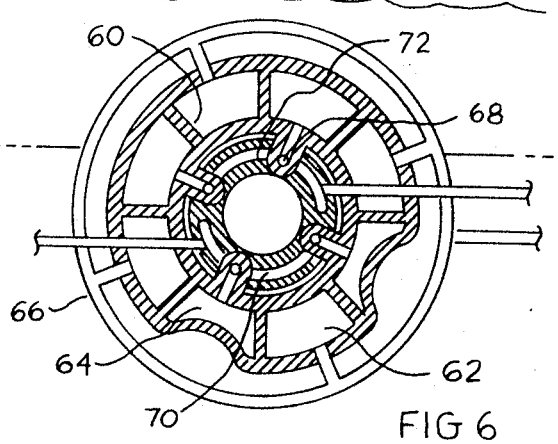
FIG. 6 shows a configuration using a segmented pneumatic wheel similar to that shown in FIG. 3, in which pressure is varied in alternate chambers during a fixed angle of rotation with respect to a spatial reference, so that the wheel has a contoured shape for part of its rotational travel and a circular contour for the remainder of the travel.

FIG. 3 shows a system for varying the contour of a driving wheel in which a segmented wheel with alternate inflatable chambers is used. The wheel itself could be of standard construction and utilize a segmented tire as described in my copending application for Skid-Resisting Systems, Ser. No. 585,212. As shown in FIG. 3, the wheel includes a flexible outer wall 16, enclosing an internal annular volume 18, divided by transverse members 20 into eight chambers. Alternate chambers 22 are connected to a source of positive pressure through manifold 24; and alternate chambers 26 are connected to a source of negative pressure through manifold 28. The wheel is shown in FIG. 3 contoured for propulsion assisting; and it has the shape of a square with concave sides. The corners are supported by high-pressure chambers 22; and the walls are collapsed into negative pressure chambers 26. In its normal circular shape, the wheel will be similar in configuration to the upper, uncontoured portion of the wheel shown in FIG. 6; but with the high-pressure chambers completely lined with members 20 and the high-pressure chambers smaller in volume than the negative pressure chambers. It is to be understood that the configuration of FIG. 3 is schematic; and membranes 20 are distorted to illustrate their accommodation to the collapsed contour. When the wheel is inflated to a circular shape the corners will be drawn in radially and the walls expanded; and the shape of members 20 will more closely follow the shape of chambers as shown in FIG. 6.

Referring again to FIG. 3, positive pressure is fed to chambers 22 from a dual rotating joint 30 through line 32 and negative pressures fed to chambers 26 from the dual rotating joint 30 through line 34. An applicable construction for a dual rotating joint has been described in my copending application for Skid-Resisting Systems, Ser. No. 585,212. Positive pressure is applied to the dual rotating joint by a positive pressure source, 36, such as a compressor, through a pressure regulator, 38; and negative pressure is applied to the rotating joint by a negative pressure source, 40, through a vacuum regulator, 42. When the inflatable wheel is to be restored to a circular shape, vacuum regulator 42 is closed and valve 44 is opened, connecting all chambers to the same source of positive pressure.

It should be appreciated that negative pressure is shown for use with a wheel that is circular in its normal, unstressed condition. The wheel can also be constructed, by appropriate molding or fabrication, so that in its unstressed condition it has a contoured shape for propulsion, comparable to that shown in FIG. 3, and the same positive pressure can be applied to both sets of chambers to achieve a circular shape. Also, for an appropriate unstressed contour, providing alternately indented and raised segments, members 20 can be eliminated, eliminating independent chambers; and annulus 18 alone need be pressurized to achieve the desired circular shape for normal road operation.

Figure 4:
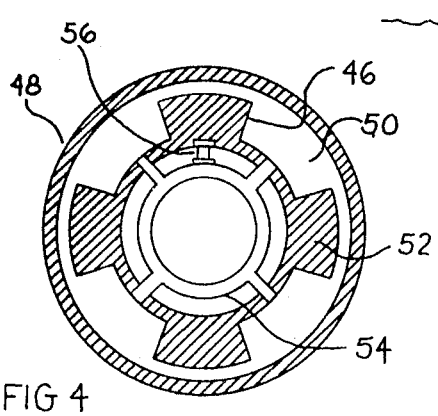
FIG. 4 shows an alternate construction of an inflatable wheel in which a negative pressure is applied internally to produce a contoured shape of the wheel.
Figure 5:
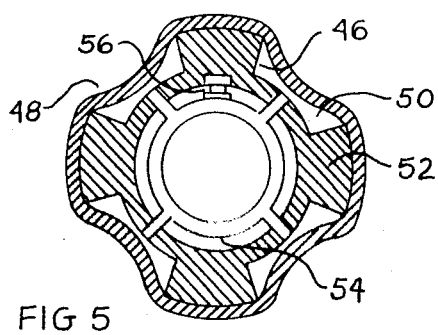
FIG. 5 shows a wheel construction similar to that of FIG. 4 in which a positive pressure is applied internally to produce a circular shape of the wheel.

FIGS. 4 and 5 show another construction for a variably contourable wheel in which a relatively rigid internal member acts as a support for the flexible outer wall to provide the required shape for propulsion assistance. As shown in FIGS. 4 and 5, the relatively rigid support 46 is contoured on its interior surface, facing the flexible wall 48 into alternately indented segments or cavities 50 and raised, solid segments 52. The cavities 50 are interconnected by a passage 54, which is terminated in a pressure fitting 56. The passage is shown schematically as a manifold; but it should be understood that other interconnecting channels in the walls of the wheel or in the solid segments can be used.

In FIG. 4 the flexible wall 48 is circular in its unstressed condition. Positive pressure is applied to fitting 56 to maintain the circular shape for operation on roads and hard surfaces. A gap is shown between the solid segments and the flexible wall so that the wheel can be used as a normal inflatable wheel with no load being applied to the internal solid support. To achieve the contour required for propulsion assistance, fitting 56 is connected to a negative pressure source, causing the flexible outer wall to collapse against the contoured support.

In FIG. 5, the flexible outer wall is normally contoured and supported by support 46 in its unstressed condition. The wheel is not pressurized when it is used for propulsion; but positive pressure is applied to fitting 56 to expand outer wall 48 into a circular shape for road operation.

The shape of the solid support 46 is shown for purposes of illustration only. Obviously, any number of solid segments and cavities of varying widths or depths can be used.

A rigid support is shown in FIGS. 4 and 5 to assure conformance of a relatively flexible wall to a predetermined contour. The support can be eliminated through use of a precontoured outer wall of sufficient strength to withstand hydraulic forces during propulsion and capable of being expanded to circular shape by application of internal positive pressure. Also, the flexible wall can be fabricated to have an unstressed circular shape with segments of varying thicknesses so that the wall collapses to a predetermined contour for propulsion by application of internal negative pressure.

FIG. 6 shows a configuration for contouring an inflatable wheel at the bottom of its rotation to entrain a maximum amount of water for propulsion and for inflating it to a circular shape at the top of its rotation to minimize circulation of water around the wheel. As shown in FIG. 6, the wheel includes a flexible outer wall 58, an internal annular volume divided by transverse members 60 into a first set of alternately spaced chambers 62 and a second set of alternately spaced chambers 64. Chambers 62 are connected through manifold 66 to a constant source of positive pressure. Chambers 64 are connected to a source of negative pressure as the chambers rotate through a fixed angle with reference to a spatial reference by means of sliding ports 68, communicating with stationary slot 70, which is connected to a negative pressure source. As chambers 64 rotate through the remainder of the spatially fixed circle of rotation, sliding ports 68 communicate with stationary slot 72, which is connected to a third and positive source of pressure. As chambers 64 travel through the angle where ports 68 communicate with slot 70, their outer walls collapse, providing a propulsion contour in that angle of rotation. When ports 68 communicate with slot 72, the chambers will be exposed to positive pressure and the outer wall will be circular. It is anticipated that slot 72 will be connected to the same pressure as manifold 66; but a separate supply is shown to permit for varying stiffnesses in the walls of the two sets of chambers.

What is claimed is:

1. A system to assist the propulsion of a wheeled vehicle supported by a fluid or soft solid medium including, an inflatable wheel, means for varying the contour of the outer surface of the wheel between a circular shape and a shape which includes one or more pairs of alternately indented and raised segments by variation of fluid pressure within the wheel, one or more alternate segments maintaining a constant geometry through out rotation of the wheel, and means operatively connected to the wheel for applying a variable pressure to alter its outer surface between a circular and segmented shape to increase the reaction between the wheel and the supporting medium.

2. A propulsion-assisting system of the character described in claim 1 in which the wheel includes an internal annular volume divided by transverse members into a plurality of chambers and the pressurizing means applies a first common pressure to a first set of alternately spaced chambers and a second common pressure to the remaining alternately spaced chambers.

3. A propulsion-assisting system of the character claimed in claim 2 in which the unpressurized contour of the outer circumference of the wheel is circular and the pressurizing means applies a positive pressure to the first set of alternately spaced chambers and a negative pressure to the remaining alternately spaced chambers to vary the contour.

4. A propulsion-assisting system of the character claimed in claim 2 in which the unpressurized contour of the outer circumference of the wheel is noncircular and the pressurizing means applies positive pressures to both sets of chambers to provide a circular contour.

5. A propulsion-assisting system of the character claimed in claim 1 in which the wheel includes a relatively flexible circular outer wall and an inner wall, which forms a relatively rigid support, contoured on its interior surface into alternately indented and raised segments, and the pressurizing means varies the contour of the outer wall by producing a negative pressure within the wheel, causing the outer wall to collapse against the contoured support.

6. A propulsion-assisting system of the character claimed in claim 1 in which the wheel includes an inner wall which forms a relatively rigid support, contoured on its interior surface into alternately indented and raised segments, and a relatively flexible outer wall, which is normally collapsed against the contoured support, and the pressurizing means applies positive pressure within the wheel to provide a circular contour to the outer wall.

7. A propulsion-assisting system of the character described in claim 1 in which the wheel includes an outer wall and an internal annular volume divided by transverse members into a plurality of chambers, and the pressurizing means applies a first common pressure to a first set of alternately spaced chambers, a second pressure to the remaining alternately spaced chambers to form pairs of alternately indented and raised segments in the outer wall as the chambers rotate through a fixed angle with respect to a spatial reference; and a third pressure to the remaining alternately spaced chambers to provide a circular contour of the outer wall as the chambers rotate through the remainder of the spatially fixed circle of rotation.

8. A propulsion-assisting system of the character claimed in claim 1 in which the pressure is applied to the wheel by means of a rotating joint connected to a nonrotating source.

9. A propulsion-assisting wheel having an annular casing with a flexible wall, a segmented annular support within the casing consisting of solid segments equidistantly spaced along the circumference of the annulus and separated by cavities and a passage connecting the cavities and terminating in a fitting for applying a pressure to the interior of the annulus.

10. A propulsion-assisting wheel of the character claimed in claim 9 in which the flexible wall fits tightly against the segments and protrudes into the cavities when the annulus is unpressurized and the flexible wall inflates to a circular shape when positive pressure is applied to the interior of the annulus.

11. A propulsion-assisting system of the character claimed in claim 1 in which the wheel includes a relatively flexible circular outer wall having alternate segments of different stiffnesses, and the pressurizing means varies the contour of the outer wall into alternately indented and raised segments by producing a negative pressure within the wheel.

12. A propulsion-assisting system of the character claimed in claim 1 in which the wheel includes a relatively flexible circular outer wall which is normally contoured into alternately indented and raised segments, and the pressurizing means applies positive pressure within the wheel to provide a circular contour to the outer wall.

* * * * *